United States Patent [19]

Oltman et al.

[11] 4,343,869
[45] Aug. 10, 1982

[54] SEAL FOR METAL-AIR BATTERIES

[75] Inventors: John E. Oltman, Mt. Horeb; Robert B. Dopp, Madison, both of Wis.

[73] Assignee: Ray-O-Vac Corporation, Madison, Wis.

[21] Appl. No.: 233,074

[22] Filed: Feb. 9, 1981

[51] Int. Cl.³ .................................... H01M 2/14
[52] U.S. Cl. ............................. 429/27; 429/36; 429/162
[58] Field of Search ............... 429/27, 35, 36, 162, 429/164, 172, 174, 185, 169

[56] References Cited

U.S. PATENT DOCUMENTS

| 3,746,580 | 7/1973 | Aker et al. | 429/27 |
| 3,897,265 | 7/1975 | Jaggard | 429/35 |
| 4,041,211 | 8/1977 | Wiacek | 429/36 |
| 4,054,726 | 10/1977 | Sauer et al. | 429/27 X |
| 4,064,329 | 12/1977 | Naylor | 429/174 |
| 4,118,544 | 10/1978 | Przybyla et al. | 429/27 |

FOREIGN PATENT DOCUMENTS 1178859 1/1970 United Kingdom .
1319780 6/1973 United Kingdom .

Primary Examiner—Anthony Skapars
Attorney, Agent, or Firm—Raymond J. Kenny; Edward A. Steen

[57] ABSTRACT

An improved metal-oxygen button cell having a thermoplastic sealing annular ring placed between the cathode assembly and the grommet is provided. The cell basically is comprised of the following components: a conductive metal can, a cathode assembly in the can, a conductive metal cover, an anode material in the cover, a separator between the cathode assembly and anode material, a grommet and a thermoplastic sealing annular ring.

6 Claims, 1 Drawing Figure

U.S. Patent    Aug. 10, 1982    4,343,869
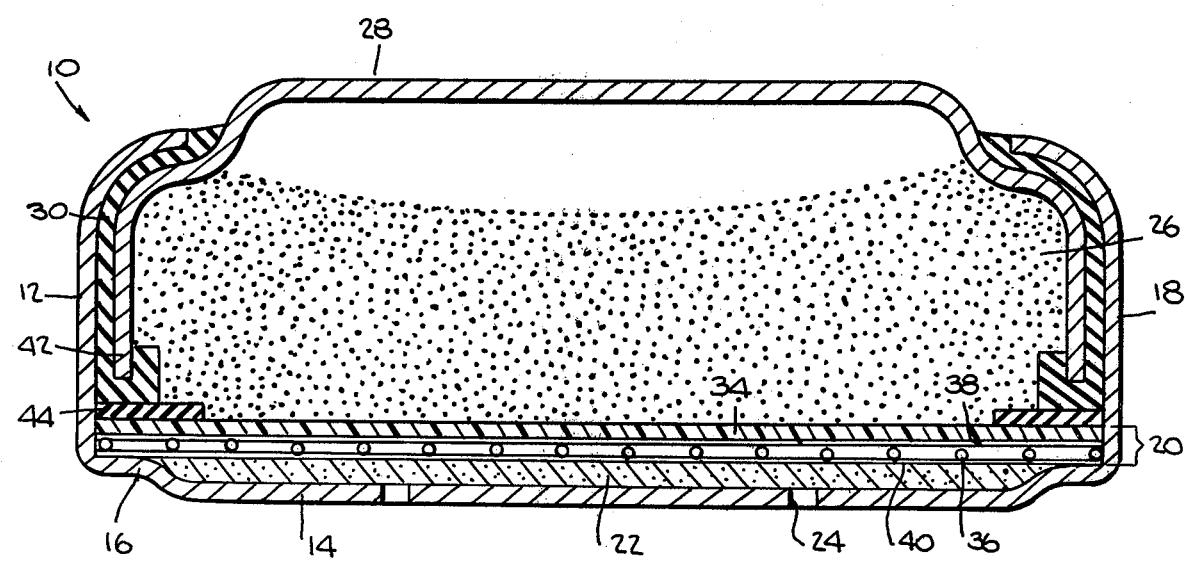

4,343,869

SEAL FOR METAL-AIR BATTERIES

BACKGROUND OF THE INVENTION

1. Field of the Invention

This invention relates to oxygen depolarized electrochemical cells. More particularly, it relates to metal/oxygen batteries having improved sealing characteristics.

2. Prior Art

The concept of gas depolarized electrochemical cells is old in the art as evidenced by the numerous issued patents.

It is also known that gas depolarized electrochemical cells can have a "button" cell configuration and be used in a variety of applications such as hearing aids, transistor radios, watches, and miniature electronic calculators.

Patents disclosing such button cells are
Gillespie-U.K. Pat. No. 1,319,780
Jaggard-U.S. Pat No. 3,897,265
Aker-U.S. Pat. No. 3,746,580
Fangradt-U.K. Pat. No. 1,178,859

The present invention is an improvement over these zinc/air button cells.

All of the above references disclose zinc/oxygen button cells having an anode, an anode cover, a cathode assembly, a cathode can, a grommet and a separator.

The current inventors have found that cells similar to those disclosed by Gillespie and Jaggard sometimes during closure have damage to the cathode assembly thereby shorting the cell and causing leakage.

The Aker and Fangradt references disclose means to improve leakage characteristics by preventing damage to the cathode assembly and thereby preventing shorting.

The Aker cell is characterized by the periphery of the cathode assembly having a frame of non-conductive material molded around it. The frame is in contact with the grommet.

The Fangradt cell is characterized by having the non-conductive grommet hermetically bonded around the periphery of the cathode assembly.

Hence, the prior art teaches that to have a leak resistant metal/oxygen button cell, which will not short upon closure, the cathode assembly should have a non-conductive material molded around its periphery. This, however, increases the cost and difficulty of manufacture.

It would be desirable to be able to manufacture a cell having good leak resistant characteristics which did not short upon closure and would not need this measure.

DRAWING

FIG. 1 is a cross-sectional view of a zinc/air button cell according to a preferred embodiment of the invention.

SUMMARY OF THE INVENTION

A metal/oxygen button cell is provided comprising an anode cover, an anode material, a cathode assembly, a cathode container, a grommet, a separator and a thermoplastic sealing annular ring.

In the cell the thermoplastic sealing annular ring is placed so one side contacts the grommet and extends beyond the grommet, while the other side contacts the separator. Also, the outer edge contacted the cathode container, preferably in a press fit. The inner edge will contact the anode materials.

BRIEF DESCRIPTION OF THE DRAWING

While the specification concludes with claims, particularly pointing out and distinctly claiming the subject matter which is regarded as the invention, it is believed that the invention would be better understood from the following description of a preferred embodiment taking in conjunction with the accompanying drawing in which FIG. 1 is a vertical section through a zinc/air button cell according to a preferred embodiment of the invention.

DESCRIPTION OF A PREFERRED EMBODIMENT

Referring now to the preferred embodiment of the FIGURE, shown as zinc/air button cell (10).

The cell (10) comprises a can (12) of, for example, nickel plated steel, nickel, alloys of nickel, stainless steel, etc., which forms a partial enclosure having a open top, relatively flat bottom portion (14) with a shoulder (16) and a cylindrical wall portion (18).

A cathode assembly generally designated at (20) lies within the can (12).

A porous layer (22) serves both to distribute air uniformly over the cathode assembly and to provide support for the cathode assembly (20).

Admission of air to the cell is through at least one air passageway (24) in the flat bottom wall (14) of sufficient size to provide the cathode assembly (20) with access to the atmosphere through the porous layer (22).

An anode material (26), which can consist of any conventional porous mass of a suitable metal powder, e.g., a gelled amalgamated zinc powder or a sintered zinc compact, is situated within a compartment formed by the conductive metal cover (28), which serves as the negative terminal of the cell.

The metal cover is positioned within the wall portion (18) of the can (12) and is secured thereto with a grommet (30) which may be coated with an adhesive such as epoxy, polyamide or bitumin.

The anode material (26) is separated from the cathode assembly (20) by a separator (34).

The separator (34) can be any conventional material known in the art. These known materials include Pudo cellophane, Acropor WA (woven nylon base treated with polyvinylchloride), Celgard (microporous polypropylene), Permion (polyethylene grafted with polyvinyl chloride), Viscon (regenerated cellulose treated with polyvinylchloride), Pellon (polyester based), Dynel (acrylic copolymer) and the like.

An absorbant may be used and constructed of any porous cellulose material or any other material conventionally used in batteries.

An electrolyte solution is added to the cell during assembly. A suitable alkaline electrolyte can be aqueous KOH or NaOH and a suitable electrolyte for cell using an organic redox system include an aqueous solution of zinc chloride and mixtures of zinc chloride and ammonium chloride. A substantially neutral electrolyte system may include ammonium chloride or manganese chloride or a mixture of manganese chloride and magnesium chloride solution.

The preferred cathode assembly (20) is a laminated structure. It is comprised of a current collector (36), an activating layer (38) and a hydrophobic layer (40). In the more preferred embodiment the barrier layer is and the separator layer may be laminated to the cathode assembly.

The activating layer (38) usually is comprised of a pressed mixture of a hydrophobic material, such as a polyolefin, eg. polyethylene and polypropylene and fluorocarbon, such as polytetrafluoroethylene, and material such as activated carbon or metal catalysts. It is preferred that the activating layer is a mixture of polytetrafluoroethylene and activated carbon.

Pressed adjacent to, embedded in or contained within the active material is the current collector (36). The current collector is for current takeoff and is in electrical contact with the cathode container. The current collector (36) may be an conductive metal, eg., nickel or stainless steel and may be a film, mesh or screen. It is preferred that the current collector is a nickel screen.

On the side of the active layer facing the air inlet opening there is at least one porous hydrophobic layer.

The purpose of this layer is to permit the passage of air to the active layer while preventing leakage of the electrolyte from the cell.

It is sometimes desirable to utilize more than one hydrophobic layer because faults may exist in the layer through which leakage may occur. The use of more than one layer reduces substantially the risk that leakage will occur through faults in the layer.

The hydrophobic layer may be comprised of a hydrophobic polymer having an oxygen permeability suitable for providing a predetermined oxygen flow into the cell corresponding to the average current density requirement of the cells. These materials include polyethylene, polypropylene, nylon, vinylidine chloride, vinyl chloride and fluorocarbon such as polytetrafluoroethylene. Polytetrafluoroethylene is the preferred material.

The cathode container contains a shoulder (16) which bears the closing force which is transferred during a crimping process via edge (42) of anode top (28) to the grommet (30) and to the washer (44).

It is preferred that the grommet (30) be J-shaped to enable the edge (42) of the top (28) to be inserted into the grommet (30).

Under the influence of this closing force, an electrolyte tight seal is produced between the sealing annular ring (44), cathode assembly (20) and shoulder (16) so that the electrolyte cannot penetrate into the porous layer (22) by creeping around the assembly.

The thermoplastic sealing annular ring and the grommet can be comprised of any non-conductive,, alkali-resistant, elastic material. The ring and grommet do not have to be the same material. These materials include polyacetals, ABS resins (acrylonitrite-butadiene-styrene copolymers) polyamides (eg., Nylon 6, Nylon 6,6, Nylon 6,10, Nylon 11, Nylon 12) synthetic rubbers (eg. butyl rubber, silicone rubber, ethylene-propylene rubber, chloroprene rubber), polyolefins (polyethylene, polypropylene), fluorocarbons (tetrafluoroethylene) and other polymers such as polystyrene.

preferred for the sealing annular ring are polyethylene and polystyrene.

The cell can be made simply and economically by placing the porous layer into the cathode can, placing thereon the cathode assembly, (a laminate of the hydrophobic layer, the active layer, the current collector, disc and the separator) and then inserting the washer.

The anode top onto which has been placed the grommet and into which has been placed the anode material in which the electrolyte is added is fitted into the cathode can.

The can is crimped, as known by those skilled in the art, to form a completed cell.

We claim:

1. An improved metal-air button cell including a conductive metal can having a shoulder at the periphery of the bottom of the can, means for permitting introduction of oxygen into the cell, a cathode disposed within the can and a portion thereof supportedly registered against the shoulder of the can, a separator disposed above the cathode assembly, an anode disposed within the cell, a J-shaped grommet adhesively bonded to the inner surface of the can and a conductive cover sealingly inserted into the grommet, wherein the improvement comprises a thermoplastic annular ring sandwiched between the separator and the grommet.

2. The cell according to claim 1 wherein the outer edge of the ring is tightly registered against the inner surface of the can.

3. The cell according to claim 1 wherein the inner surface of the ring contacts the anode.

4. The cell according to claim 1 wherein the annular ring is comprised of polyethylene or polystyrene.

5. The cell according to claim 1 wherein the cathode comprises an activating layer, a current collector and a hydrophobic layer, the components forming a laminated cathode assembly.

6. The cell according to claim 5 wherein the assembly includes zinc, the activating layer includes activated carbon and polytetrafluoroethylene, the current collector is a nickel screen and the hydrophobic layer is polytetrafluoroethylene.

* * * * *